(12) United States Patent
Wang (10) Patent No.: US 10,786,907 B2
(45) Date of Patent: Sep. 29, 2020

(54) MANIPULATOR AND ROBOT WITH FINGERTIP MODULE

(71) Applicant: SHENZHEN DORABOT ROBOTICS CO., LTD., Shenzhen (CN)

(72) Inventor: Zhi-Kang Wang, Shenzhen (CN)

( * ) Notice: Subject to any disclaimer, the term of this patent is extended or adjusted under 35 U.S.C. 154(b) by 136 days.

(21) Appl. No.: 16/308,086

(22) PCT Filed: Oct. 28, 2016

(86) PCT No.: PCT/CN2016/103855
§ 371 (c)(1),
(2) Date: Dec. 7, 2018

(87) PCT Pub. No.: WO2018/076303
PCT Pub. Date: May 3, 2018

(65) Prior Publication Data
US 2019/0299422 A1    Oct. 3, 2019

(51) Int. Cl.
*B25J 15/00*    (2006.01)
*B25J 13/08*    (2006.01)
*B25J 9/00*    (2006.01)
*B25J 9/16*    (2006.01)
*B25J 15/08*    (2006.01)
*B25J 15/10*    (2006.01)

(52) U.S. Cl.
CPC ......... *B25J 15/0009* (2013.01); *B25J 9/0015* (2013.01); *B25J 9/1612* (2013.01); *B25J 9/1697* (2013.01); *B25J 13/08* (2013.01); *B25J 13/084* (2013.01); *B25J 15/08* (2013.01); *B25J 15/083* (2013.01); *B25J 15/10* (2013.01)

(58) Field of Classification Search
CPC .... B25J 15/0009; B25J 13/082; B25J 13/089; B25J 13/088
See application file for complete search history.

(56) References Cited

U.S. PATENT DOCUMENTS

| 8,833,826 B2 * | 9/2014 | Garcia | B25J 15/0009 |
| | | | 294/111 |
| 2010/0145518 A1 * | 6/2010 | Kim | B25J 13/08 |
| | | | 700/258 |
| 2014/0035306 A1 * | 2/2014 | Garcia | B25J 15/0009 |
| | | | 294/213 |

FOREIGN PATENT DOCUMENTS

CN    105171767 A  * 12/2015

* cited by examiner

*Primary Examiner* — Gerald McClain
(74) *Attorney, Agent, or Firm* — W&K IP; Jie Yang (57) ABSTRACT

A manipulator comprises a connecting assembly; a plurality of finger assemblies, one end of each finger assembly connects to the connecting assembly, the other end is away from the connecting assembly to form a free end; each finger assembly includes a plurality of knuckle components which are successively connected, each knuckle component includes a base module, a tactile sensor and an angle sensor, the base modules are interconnected for implementing finger configuration, the tactile sensor is installed on the base module for sensing a target object, the angle sensor is installed on the base module for acquiring information of angle changing. The manipulator is provided with the tactile sensor and the angle sensor on the base module of each knuckle component, which is beneficial to improve the sensing ability of the manipulator. The manipulator is composed of modular knuckle components, each of the single knuckle components has high level of integration.

13 Claims, 9 Drawing Sheets

MANIPULATOR AND ROBOT WITH FINGERTIP MODULE

CROSS REFERENCE TO RELATED APPLICATIONS

This application is a national stage filing under section 371 of International Application No. PCT/CN2016/103855 filed on Oct. 28, 2016, which is published in Chinese on May 3, 2018 as WO2018/076303, the disclosure of which are hereby incorporated by reference in their entirety.

FIELD OF THE INVENTION

The invention pertains to the field of robotics, and in particularly relates to a manipulator and a robot having the same.

BACKGROUND OF THE INVENTION

With the development of society, the demographic dividend is decreasing, and the problem of aging is getting worse. More repetitive work needs to be replaced by more efficient robots. It is also increasingly demanding for the functional requirements of the end effector of the robots, such as the operation of human tools, the grasping and picking of the target objects, and the like. A more typical application is in the field of e-commerce (warehouse systems). For the business strategy needs of rapid response to orders, there is an urgent need to find new ways to replace manual orders.

With the continuous maturity of robotics, the robot gradually goes out of the laboratory and becomes available in the consumer market. This requires that the price of robotic equipment cannot be too high. It is also applicable for the research of dexterous hands. At the same time, the robotic equipment should not be too large and should be able to adapt to the daily life of human scenes, including various life production tools used by humans. The volume and the weight of the equipment are mainly concentrated in the driving mechanism. Moreover, the number of the drivers used on the underactuated dexterous hand is less than the freedom degree of the robot, so that it can be portable and compact, and also reduces the difficulty of controlling.

The general dexterous hand does not consider the installation of the sensor alone, a simple driving mechanism is often designed, and then corresponding sensors are added afterwards. A dexterous hand with no sensors can also achieve the grasping function, but it has a great limitation, the operation and the perception of the objects cannot satisfy higher requirements.

SUMMARY OF THE INVENTION

An advantage of some aspects of the invention to provide a manipulator that can solve the problem of how to set the sensors of the manipulator and highly improve the sensing ability of the manipulator.

In accordance with an aspect of the invention, there is provided a manipulator. The manipulator includes a connecting assembly; a plurality of finger assemblies, one end of each finger assembly connects to the connecting assembly, the other end is away from the connecting assembly to form a free end; each finger assembly includes a plurality of knuckle components which are successively connected, each knuckle component includes a base module, a tactile sensor and an angle sensor, the base modules are interconnected for implementing finger configuration, the tactile sensor is installed on the base module for sensing a target object, the angle sensor is installed on the base module for acquiring information of angle changing.

In accordance with an aspect of the invention, there is also provided a robot having the above manipulator, the manipulator is installed on an end effector of the robot.

The manipulator provided by the embodiment of the present invention connects a plurality of finger assemblies onto the connection assembly, and one end of each finger assembly is connected on the connection assembly, the other end is away from the connection assembly to form a free end, so that each finger component has the freedom of extension. Each finger assembly of the manipulator includes a plurality of knuckle components, and the tactile sensor and the angle sensor are installed on the base module of the knuckle components, which is beneficial for improving the sensing ability of the manipulator. The manipulator is comprised of modular knuckle components with high integration, so the structure is simplified, which is beneficial for manufacturing and inventory management.

The manipulator is equipped with the tactile sensor and the angle sensor on the base module of each knuckle component, which is beneficial to improve the sensing ability of the manipulator. The manipulator is composed of modular knuckle components, each of the single knuckle components has high level of integration, which simplifies the structure and favors the manufacturing and inventory management of the components.

BRIEF DESCRIPTION OF THE DRAWINGS

The invention will be described with reference to the accompanying drawings. These and/or other aspects and advantages of the invention will become apparent and more readily appreciated from the following description of the embodiments, taken in conjunction with the accompanying drawings.

DETAILED DESCRIPTION OF THE INVENTION

Hereinafter, embodiments of the present invention will be described in detail with reference to the accompanying drawings. In the drawings referred to below, in order to clearly show components, scales, numbers, and the like in structures are sometimes differentiated from scales, numbers, and the like in actual structures. Note that the scope of the invention is not limited to the embodiments to be described below.

The invention will be further described below in details with reference to the figures and embodiments.

Referring to FIGS. 1 to 9, the manipulator according to the embodiments of the present invention includes a connecting assembly 40 and a plurality of finger assemblies 5, one end of each finger assembly 5 connects to the connecting assembly 40, the other end is away from the connecting assembly 40 to form a free end. Each finger assembly 5 includes a plurality of knuckle components 50 which are successively connected. Each knuckle component 50 includes a base module 52, a tactile sensor 54 and an angle sensor 56, the base modules 52 are interconnected for implementing finger configuration, the tactile sensor 54 is installed on the base module 52 for sensing a target object, and the angle sensor 56 is installed on the base module 52 for acquiring information of angle changing.

The manipulator provided by the embodiment of the present invention connects a plurality of finger assemblies 5 onto the connection assembly 40, and one end of each finger assembly 5 is connected on the connection assembly 40, the other end is away from the connection assembly 40 to form a free end, so that each finger component 5 has the freedom of extension. Each finger assembly 5 of the manipulator includes a plurality of knuckle components 50, and both the tactile sensor 54 and the angle sensor 56 are installed on the base module 52 of the knuckle components 50, which is beneficial for improving the sensing ability of the manipulator. The manipulator is comprised of modular knuckle components with high integration, so the structure is simplified, which is beneficial for manufacturing and inventory management.

It should be noted that the information of angle changing of each knuckle component 50 means the rotation angle of two adjacent knuckle components 50 rotating relative to each other when one certain finger assembly 5 is bent or stretched.

In order to more clearly explain the relationship between the finger assembly 5 and the knuckle component 50, the human body simulation will be illustrated as below. Each finger assembly 5 is similar to each finger of the human body, each knuckle component 50 sequentially connected to each finger assembly 5 is similar to the knuckles of the human body, and the tactile sensor 54 and the angle sensor 56 are similar to the perception neurons on the knuckles.

Figure 1:
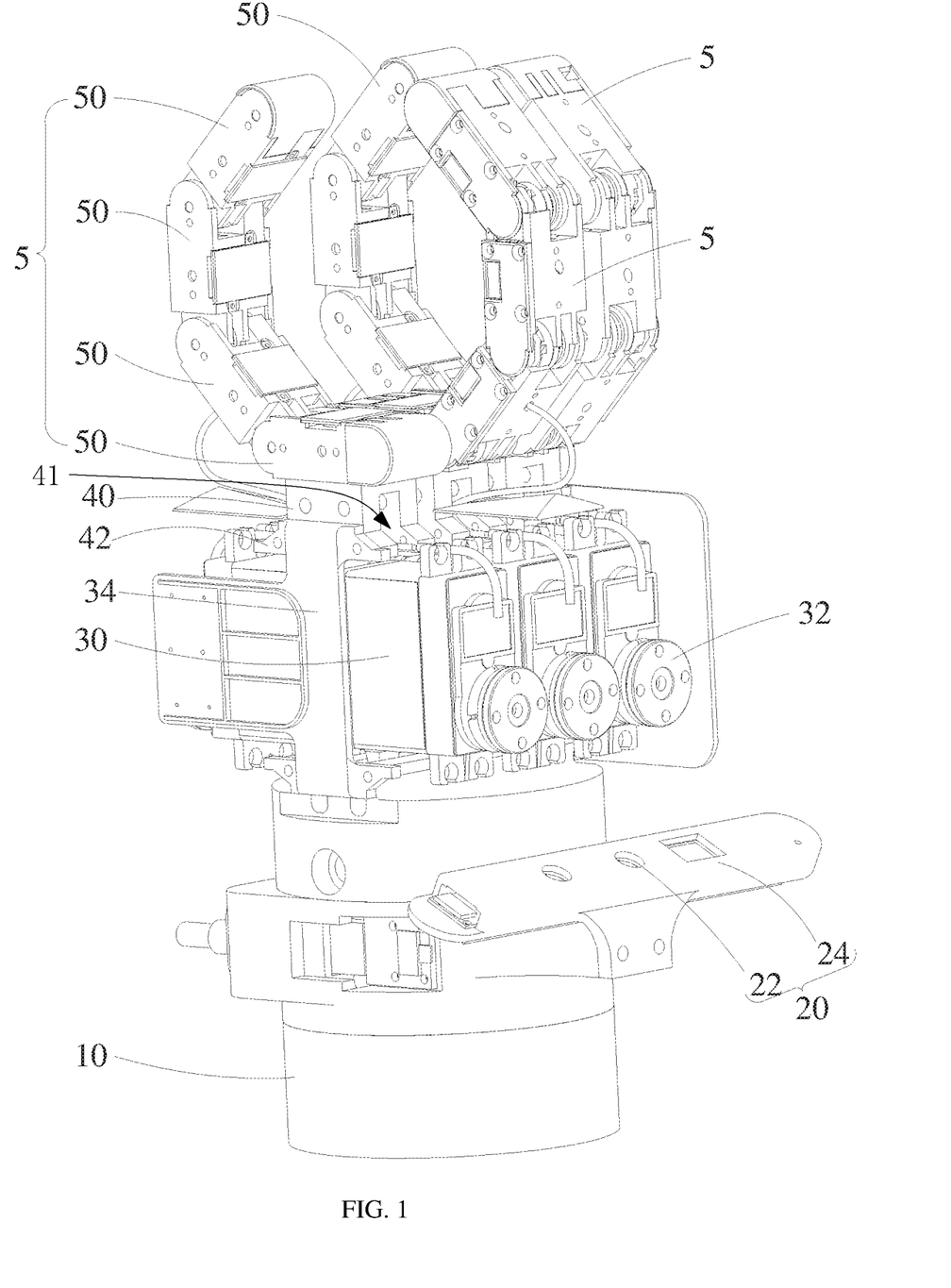
FIG. 1 is a perspective view of the manipulator according to the present invention.
Figure 2:
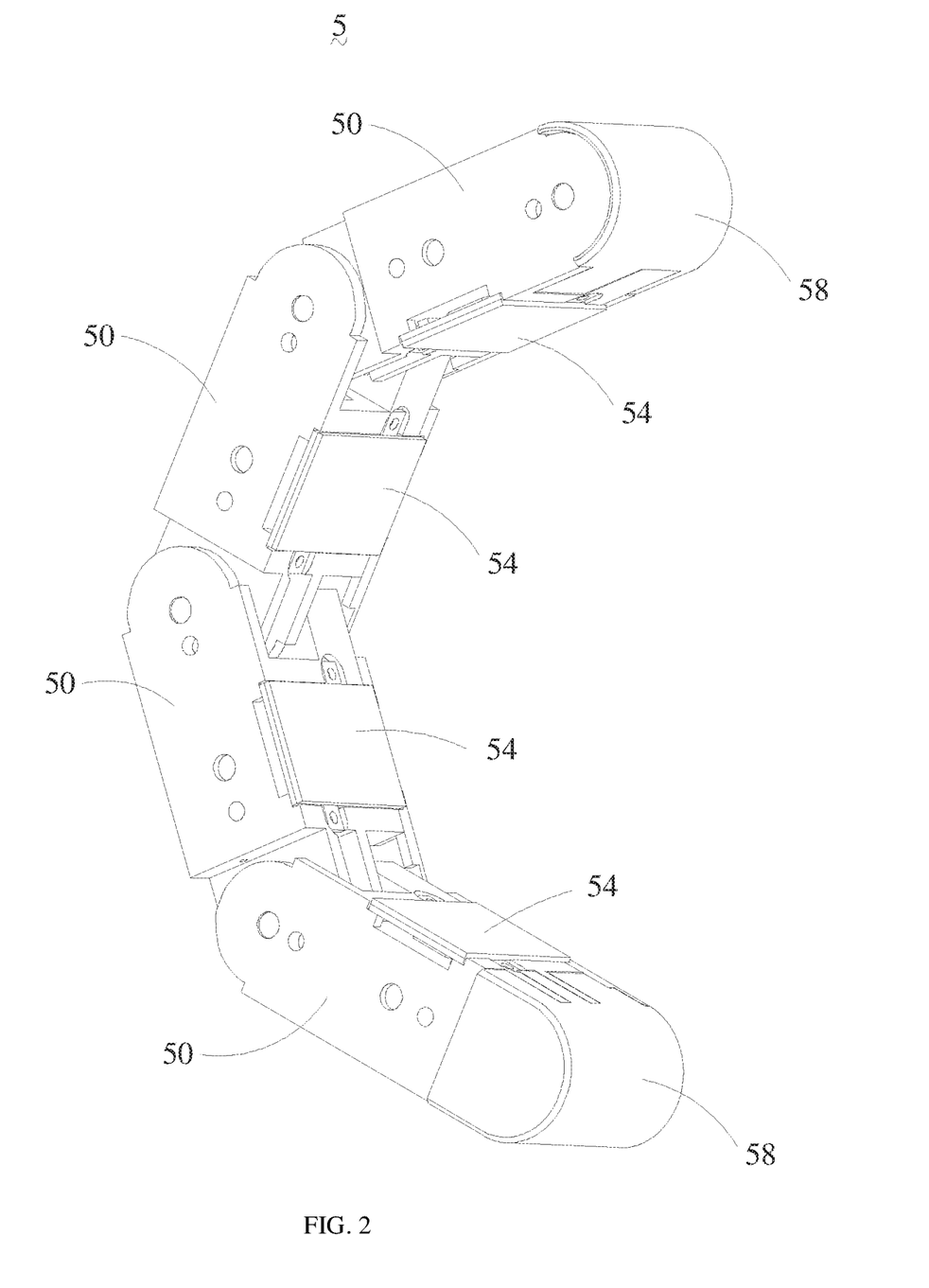
FIG. 2 is a perspective view of the finger assembly shown in FIG. 1.
Figure 3:
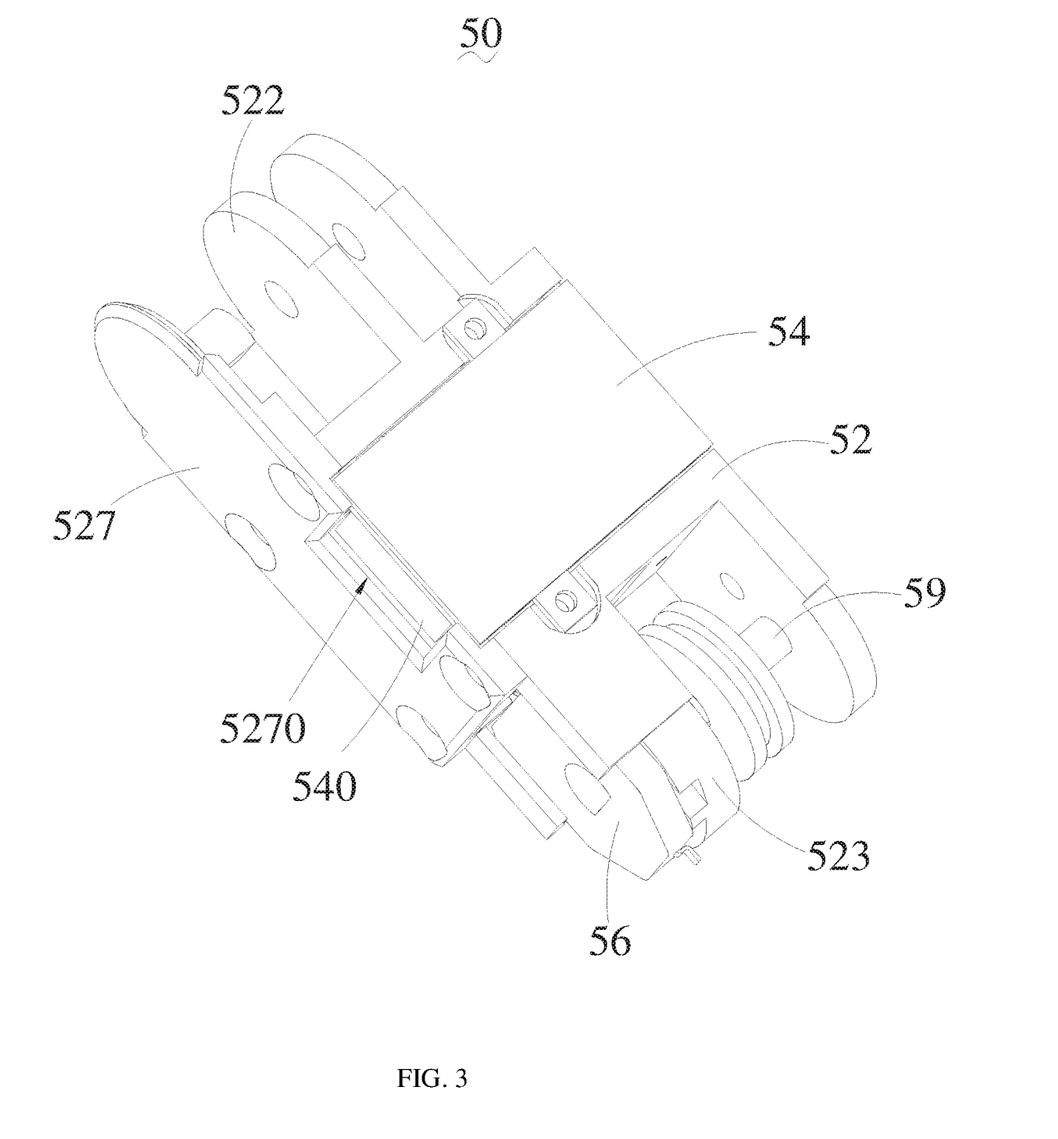
FIG. 3 is a perspective view of the knuckle component shown in FIG. 2.
Figure 4:
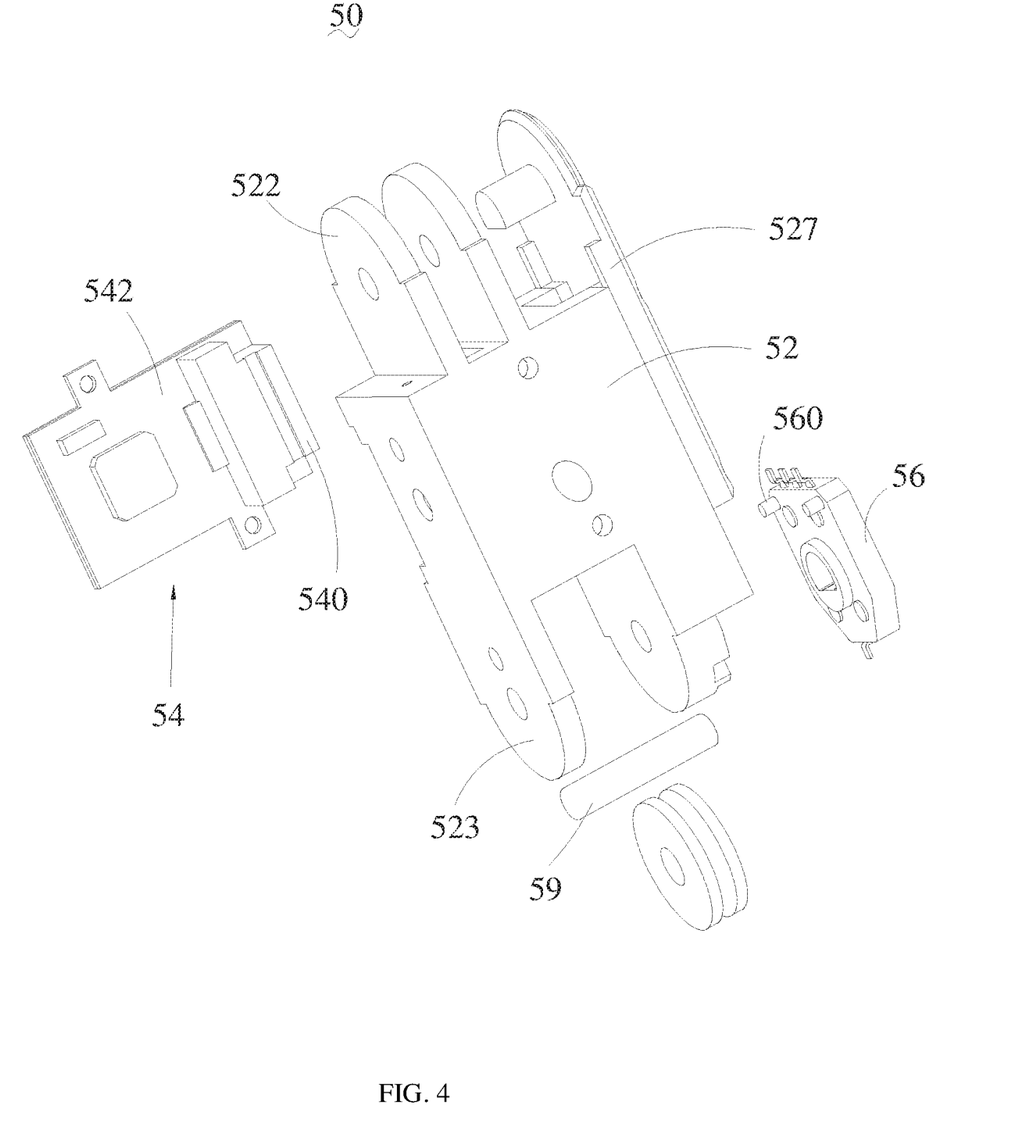
FIG. 4 is a perspective view of the knuckle component shown in FIG. 3.
Figure 5:
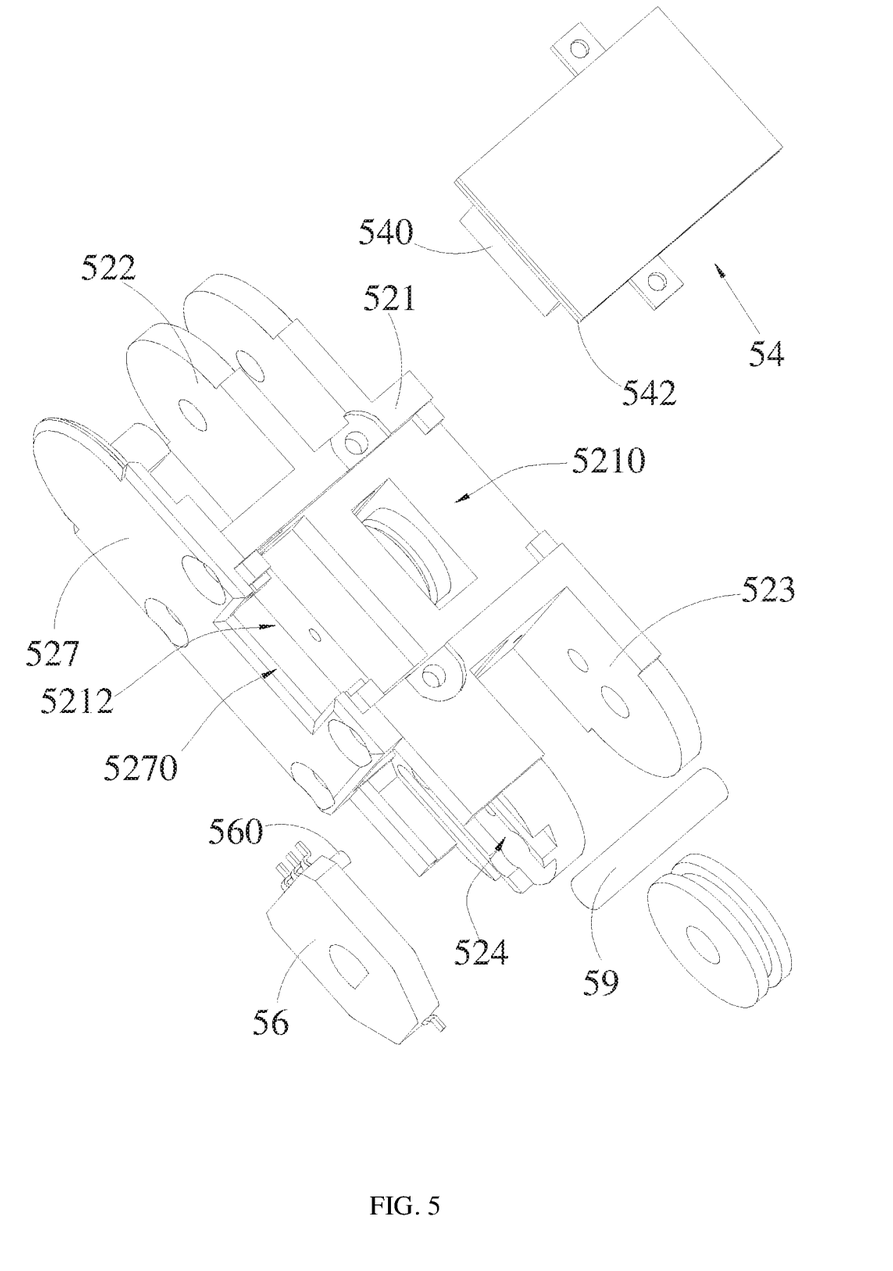
FIG. 5 is a perspective view of the knuckle component shown in FIG. 3 viewed from another direction.
Figure 6:
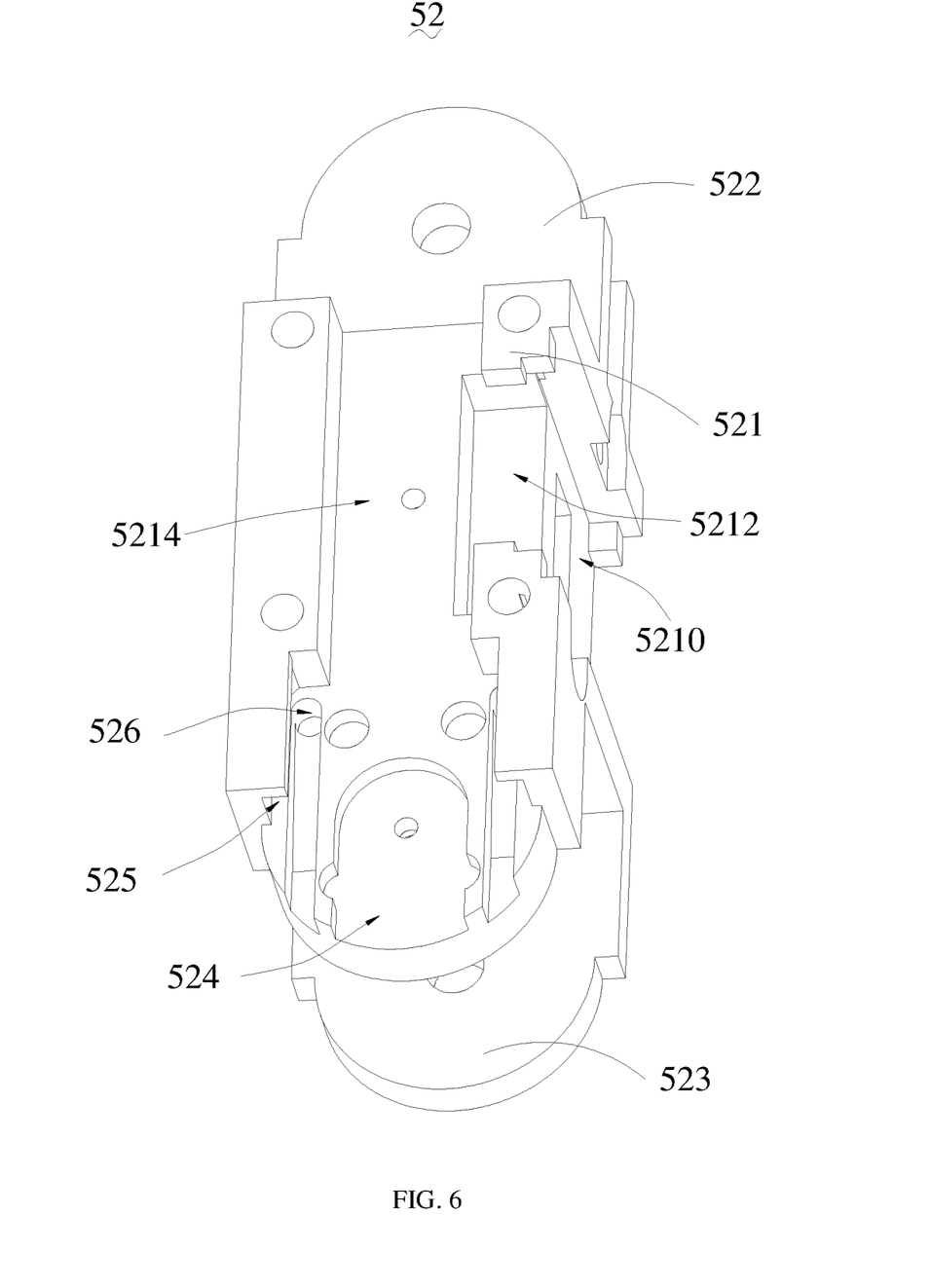
FIG. 6 is a perspective view of the base module shown in FIG. 3.
Figure 7:
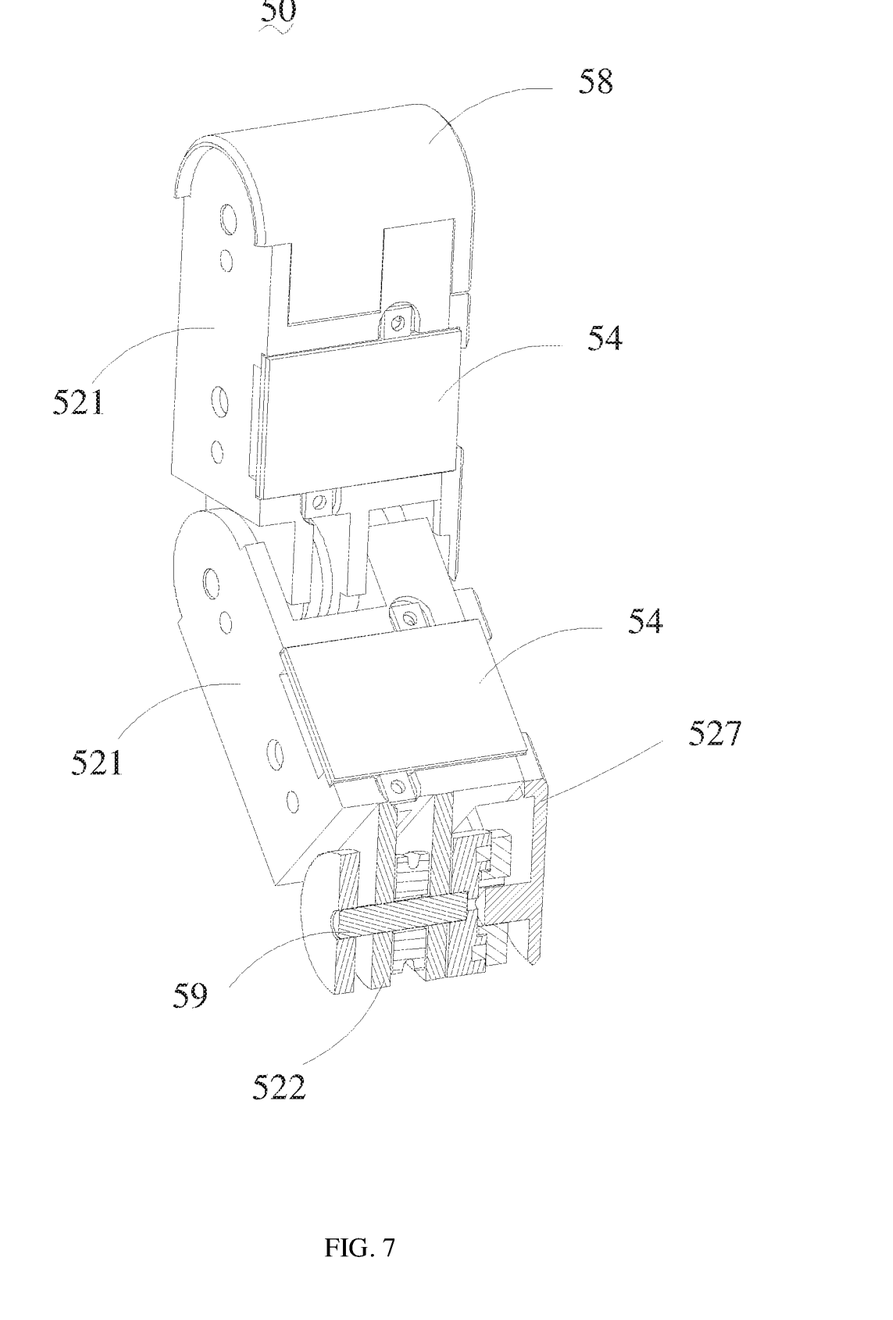
FIG. 7 is a perspective view of the finger assembly shown in FIG. 2.

Further referring to FIG. 1, each the finger assembly 5 extends along the same side of the connecting assembly 40 or along two opposite sides of the connecting assembly 40. It can be understood that, in response to different application scenes, each finger assembly 5 can be disposed on the same side of the connecting assembly 40, and each finger assembly 5 is spaced from each other. In other embodiments, each finger assembly 5 is alternatively disposed on opposite sides of the connecting assembly 40, and each finger assembly 5 is spaced from each other to form an embracing jaw structure to ensure the stability of the target object.

It can be understood that the number of the finger assemblies 5 may be three, four or five. Of course, other quantities are also possible, it is not limited thereto. It can be flexibly defined according to specific application scenarios and requirements.

One end of the finger assembly 5 is connected to the connection assembly 40. Specifically, it includes the following conditions: Including one finger assembly 5, and a distal knuckle component 50 of the finger assembly 5 is directly connected to the connecting assembly 40 and the rest of the finger assembly 5 extends from one side of the connecting assembly 40. Further including another finger assembly 5, the second finger assembly 5 is coupled to the distal knuckle component 50 of the first finger assembly 5 which has been connected to the connecting assembly 40 so that the second finger assembly 5 is indirectly coupled to the connecting assembly 40. In this embodiment, the finger assemblies 5 on two opposite sides of the connecting assembly 40 are staggered. For a robot having four finger assemblies 5, the finger assemblies 5 on two opposite sides of the connecting assembly 40 may be distributed in such a manner that two finger assemblies 5 on the same side are located between the two finger assemblies 5 on the opposite.

Referring to FIGS. 3 to 7, each finger assembly 5 further includes a connecting shaft 59 connecting two adjacent base modules 52, the axial contacting width of each base modules 52 in contact with the connecting shaft 59 is the same. The manipulator is provided with a connecting shaft 59 between two adjacent base modules 52 so that the adjacent base modules 52 can rotate relative to each other, then the angle between the adjacent base modules 52 changes. The axial contact width of each of the base modules 52 in contact with the connecting shaft 59 is the same, so that the contact portions of the connecting shaft 59 are balanced by force, and it can be prevented that the base module 52 is broken because of uneven force of the connecting shaft 59.

Referring to FIGS. 2-6, furtherly, the base module 52 includes a main body 521, a first connecting portion 522 and a second connecting portion 523, the tactile sensor 54 is installed on the main body 521, the first connecting portion 522 and the second connecting portion 523 extend from two opposites sides of the main body 521, the first connecting portion 522 and the second connecting portion 523 are defined to connect adjacent base modules 52, and the angle sensor 56 is installed on the second connecting portion 523. It can be understood that the first connecting portion 522, the main body 521 and the second connecting portion 523 are disposed along the longitudinal direction of the finger assembly 5, and the tactile sensor 54 is disposed on inner side of the main body 521, the target object is grasped on the inner side of the main body 521. The angle sensor 56 is attached to the lateral side of the second connecting portion 523 for detecting the rotation angle of two adjacent knuckle components 50. The tactile sensor 54 and the angle sensor 56 defined on the knuckle component 50 are supported and positioned via the body portion 521, the first connecting portion 522, and the second connecting portion 523, so that the manipulator is compact and the linkage of the adjacent knuckle components 50 enables the finger assembly 5 to move flexibly.

Referring to FIGS. 1, 2 and 8 and 9, the manipulator further includes a fingertip module 58, one fingertip module 58 is mounted at least on the free end of each finger assembly 5. It can be understood that each finger assembly 5 is provided with the fingertip module 58, and the fingertip module 58 is located on the free end of the finger assembly 5; alternatively, both ends of each finger assembly 5 are respectively provided with one fingertip module 58, that is, one fingertip module 58 is located on the free end of the finger assembly 5, and the other one is located on the other end of the finger assembly 5 connected to the connection assembly 40, and in conclusion each finger assembly 5 is provided with one fingertip module 58 on each end thereof. In the case when the finger assembly 5 extends along opposite sides of the connecting assembly 40 to form two fingers, two free ends are formed, and two fingertip modules 58 are respectively disposed on two free ends.

Referring to FIG. 2 to FIG. 8, the fingertip module 58 further includes a plurality of first blocks 580a and a first fingernail 582a. The first blocks 580a are spaced apart to form two first slots 581a. The first blocks 580a are fitted into the base module 52. Specifically, the first slot 581a formed by the first blocks 580a is fitted to the first connecting portion 522 to implement a slot connection. The first fingertip 582a is located on the side of the first block 580a away from the base module 52. The fingertip module 58 is coupled to the base module 52, the first connecting portion 522 is located at the free end of the finger assembly 5. It can be understood that the first connecting portion 522 is a connecting block that is spaced apart and inserted into the slot 581. The connecting block is opposite to the block 580 to realize a fixing structure, which is convenient for disassembly and installation.

Figure 8:
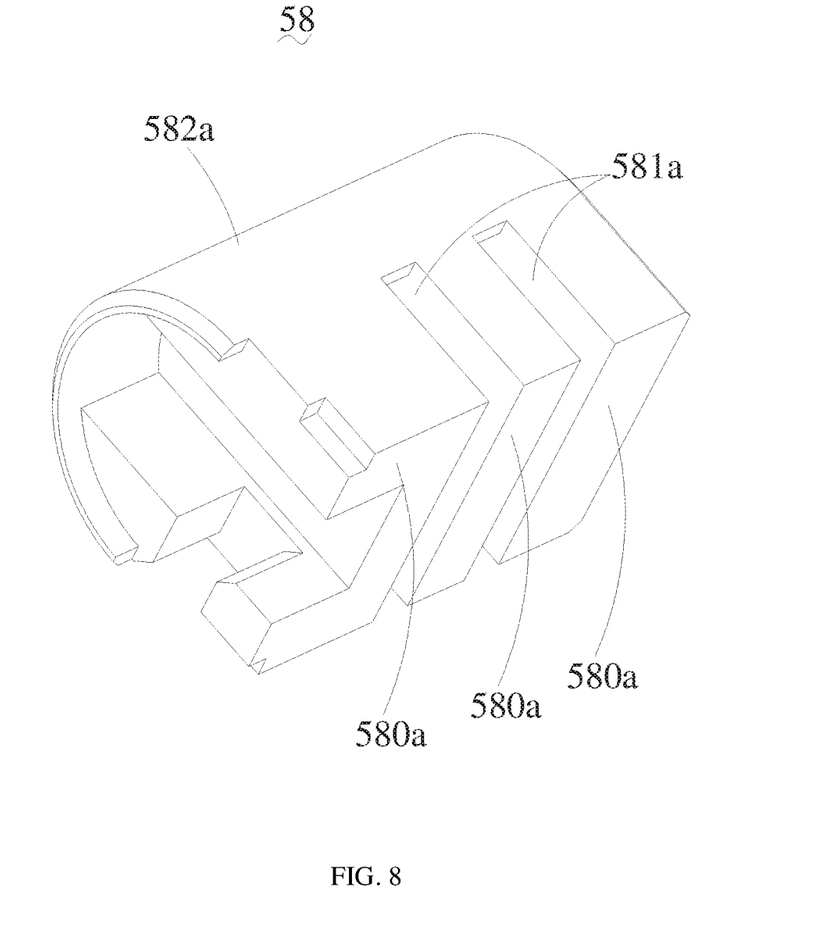
FIG. 8 is a perspective view of the fingertip module according to the embodiment of the present invention.

In this embodiment, the first fingernail 582a includes but not limited to an arc.

In this embodiment, the first fingernail 582a and the first block 580a are integrally molded, but not limited to the integral molding.

Referring to FIG. 2 to FIG. 6 and FIG. 9, the fingertip module 58 further includes two second block 580b and a second fingertip 582b, the second blocks 580b are defined to form a second slot 581b, the second block 580b is fitted into the base module 52. Specifically, the second slot 581b formed by the second blocks 580b is fitted into the second connecting portion 523, and is connected to the second connecting portion 523 to implement a slot connection. The second fingertip 582b is located on a side of the second block 580b away from the base module 52. It can be understood that the second connecting portion 523 is spaced apart and works as a connecting block inserted into the second slot 581b, the connecting block is sandwiched between two second blocks 580b to realize a fixing structure, which is convenient for disassembly and installation. The fingertip module 58 is coupled to the base module 52, the second connecting portion 523 is on a free end of the finger assembly 5.

Figure 9:
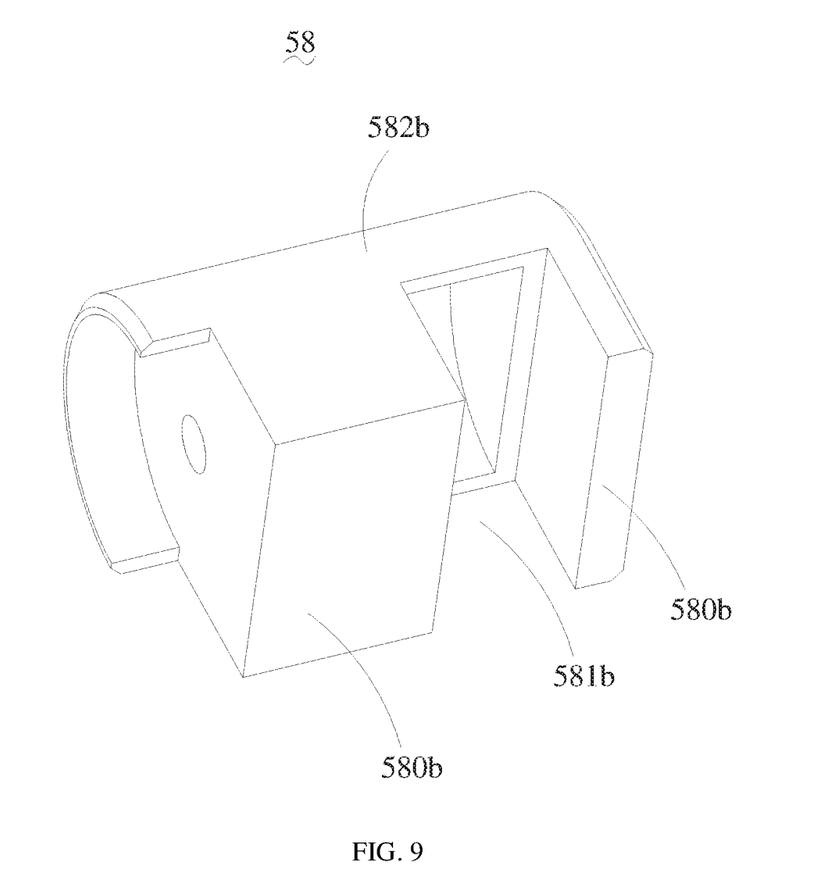
FIG. 9 is a perspective view of the fingertip module according to another embodiment of the present invention.

Specifically, the second fingernail 582b includes but not limited to an arc.

Specifically, the second fingernail 582b and the second block 580b are integrally molded, but not limited to the integral molding.

Referring to FIG. 3 to FIG. 6, each second connecting portion 523 is provided with a receiving groove 524, a sliding slot 525 and a limiting groove 526, the receiving groove 524 is on the lateral side of each second connecting portion 523 and used for accommodating the angle sensor 56 and engaging with the lateral side of the angle sensor 56, the sliding slot 525 is on the bottom of the receiving groove 524 and used for limiting the angle sensor 56, and the angle sensor 56 is provided with a limiting post 560 that fits in the limiting groove 526. The manipulator is provided with the receiving groove 524 on the second connecting portion 523 to accommodate the angle sensor 56 in the second connecting portion 523, so that the engagement of the angle sensor 56 and the base module 52 is more compact. The manipulator is provided with a sliding slot 525 on the second connecting portion 523 so that the angle sensor 56 can be slid into the receiving groove 524 from one side for easy installation. And the limiting groove 526 is disposed on the bottom of the receiving slot 524, when the angle sensor 56 slides into the sliding slot 525, the limiting post 560 is inserted into the limiting groove 526 to fix the angle sensor 56 in the receiving slot 524. Thereby, the angle sensor 56 is prevented from moving along the longitudinal direction of the sliding slot 525. The outer surface of the sliding slot 525 leans against the outer surface of the angle sensor 56, thereby preventing the angular sensor 56 from moving in the axial direction of the connecting shaft 59 and rotating about the rotating shaft 59.

It should be noted that the axial direction of the connecting shaft 59 is perpendicular to the longitudinal direction of the sliding slot 525, and the axial direction of the limiting post 560 coincides with the axial direction of the connecting shaft 59.

Referring to FIG. 3 to FIG. 6, one of the lateral sides of the main body 521 is used for gripping the target object, said lateral side of the main body 521 includes a mounting groove 5210 for positioning the tactile sensor 54, the base module 52 further includes a cover plate 527 mounted on the same side of the main body 521 as the receiving groove 524 is, the cover plate 527 covers the angle sensor 54 in the receiving groove 524. Specifically, the angle sensor 56 disposed on the second connecting portion 523 is covered by the cover plate 527 of the adjacent base module 52 to form an axial fixing. The manipulator transmits the rotational motion of the knuckle component 50 into the angle sensor 56 by a connecting shaft 59 that is coupled to two adjacent base modules 52. It is understood that the angle sensor 56 is coupled to one end of the connecting shaft 59. The manipulator embeds the tactile sensor 54 in the mounting groove 5210, the outer surface of the tactile sensor 54 is flush with the outer surface of the body portion 521 or protrudes slightly from the outer surface of the body portion 521 to reduce the volume of the knuckle components 50, so the manipulator is compact. The manipulator is provided with a cover plate 527 to seal the angle sensor 56 in the receiving groove 524 and fix the cover plate 527 to the body portion 521 by screwing. Specifically, in this embodiment, the cover plate 527 and the angle sensor 56 are fixed to the same side of the body portion 521, the cover plate 527 extends corresponding to the first connecting portion 522, the cover plate 527 is designed to cover the angle sensor 56 disposed on the second connecting portion 523 of the adjacent knuckle components 50. The cover plate 527 is axially fixed.

Referring to FIG. 3 to FIG. 6, the tactile sensor 54 further includes a circuit board 542 and a bus interface 540, the circuit board 542 is facing the mounting groove 5210, the bus interface 540 is electrically connected to the circuit board 542. The body portion 521 is further provided with a receiving slot 5212 to embed the bus interface 540. The bus interface 540 is embedded in the receiving slot 5212. The bus interface 540 is mounted on the touch sensor 54 and received in the receiving slot 5212. Specifically, the cover plate 527 is further provided with a notch 5270 exposing the bus interface 540, so that the bus interface 540 is more firmly fixed in the receiving slot 5212 and the notch 5270.

Referring to FIG. 3 to FIG. 6, the main body 521 is further provided with a wire trough 5214. In this embodiment, the wire trough 5214 and the receiving slot 5212 are disposed on the same side of the main body 521. The wire trough 5214 forms a channel towards the direction of the first connecting portion 522 and the second connecting portion 523 respectively, the wire trough 5214 communicates with the receiving slot 5212. In this embodiment, the wire trough 5214 and the receiving slot 5212 and the receiving groove 524 are located on the same side of the main body and communicates with each other. The wire trough 5214 is used for connecting to a bus (not shown) on the bus interface 540, and the wire trough 5214 is shielded by the cover plate 527 to ensure the appearance and consistency of the manipulator, and good cable management and protection of the bus are ensured. It can be understood that the wire trough 5214 communicates with the first connecting portion 522 and the second connecting portion 523 via the channels on the lateral sides.

Referring to FIG. 1, further, the manipulator further includes a driving assembly 30 mounted on the connecting assembly 40, the driving assembly 30 provides a driving force for each finger assembly 5 to perform gestures. Specifically, the driving assembly 30 connects with the knuckle components 50 of the finger assembly 5 via a driving cord (not shown), the driving assembly 3 provides linkage power for the knuckle member 50 of the finger assembly 5. In this example, the driving assembly 30 of each finger assembly 5 includes two servos 32 and a shell 34 for securing the servos 32, respectively. The shell 34 to plays the function of positioning and supporting role, and provides a certain protection of the servo 32. It should be understood that the drawings are only for the purpose of illustration, and are not intended to specifically limit the shape, size, proportion, etc. of the components. For example, the shell 34 can be a closed casing fully covering the servo 32 of the corresponding finger assembly 5.

In this embodiment, the connecting assembly 40 is located between the driving assembly 30 and the finger assembly 5.

Referring to FIG. 1, furtherly, the driving assembly 30 and the connecting assembly 40 are coupled to each other via a dovetail slot 41 and dovetail protrusions 42. The installation space is reduced between the driving assembly 30 and the connection assembly 40 as the driving assembly 30 is coupled to the connecting assembly 40 via the dovetail protrusions 42 and the dovetail slot 41, which also facilitating the routing of the wires and guarantees more stable and reliable connection between the driving assembly 30 and the connection assembly 40, improving the convenience of disassembly and assembly.

Referring to FIG. 1 to FIG. 9, the present invention provides a robot including the manipulator according to any of the above embodiments. The manipulator is mounted on the end effector of the robot. It will be appreciated that the end effector of the robot includes the end of a robot arm of the robot. The manipulator in this embodiment has the same structure as the manipulator in each of the above embodiments, and functions in the same manner, more details are not described herein.

Referring to FIG. 1, the robot further includes a visual sensor assembly 20, the visual sensor assembly 20 is positioned between the end effector and the robot arm, the visual sensor assembly 20 is used for acquiring visual information of a working area of the manipulator. In this example, the vision sensor assembly 20 is fixedly mounted to the block structure of a mounting assembly 10.

In this embodiment, the mounting assembly 10 is used for connecting the manipulator to the end effector of the robot arm, the manipulator is similar to a human hand while the mounting assembly 10 is similar to a wrist of the human hand. The set of mounting assembly 10 is provided with the block structure, the visual sensor assembly 20 is fixedly mounted to the block structure.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A manipulator, comprising:
   a connecting assembly; and
   a plurality of finger assemblies, one end of each finger assembly connects to the connecting assembly, the other end is away from the connecting assembly to form a free end;
   wherein each finger assembly includes a fingertip module and a plurality of knuckle components, the plurality of knuckle components are successively connected, each knuckle component includes a base module, a tactile sensor and an angle sensor, the base modules are interconnected for implementing finger configuration, the tactile sensor is installed on the base module for sensing a target object, the angle sensor is installed on the base module for acquiring information of angle changing, and the fingertip module is mounted on the free end of each finger assembly;
   wherein each base module includes a main body, a first connecting portion and a second connecting portion, the tactile sensor is installed on the main body, the first connecting portion and the second connecting portion extend from two opposites sides of the main body, the first connecting portion and the second connecting portion are defined to connect adjacent base modules, and the angle sensor is installed on the second connecting portion; and
   wherein the fingertip module includes a plurality of first blocks and a first fingernail, the first blocks are spaced apart to form two first slots, the first blocks are fitted into the base module and connected with the first connecting portion, and the first fingernail is located on a side of the first block away from the base module.

2. The manipulator as defined in claim 1, wherein each finger assembly extends along a same side of the connecting assembly or along an opposite sides of the connecting assembly.

3. The manipulator as defined in claim 1, wherein each finger assembly further includes a connecting shaft connecting two adjacent base modules, each base module in contact with the connecting shaft has a same axial width.

4. The manipulator as defined in claim 1, wherein each fingertip module includes a plurality of second blocks and a second fingernail, the second blocks are spaced apart to form a second slot, the second blocks are fitted into the base module and connected with the second connecting portion, the second fingernail is located on a side of the second block away from the base module.

5. The manipulator as defined in claim 1, wherein each second connecting portion includes a receiving groove, a sliding slot, and a limiting groove, the receiving groove for accommodating the angle sensor is on a lateral side of each second connecting portion, the sliding slot is defined on an inner wall of the receiving groove and engages with a lateral side of the angle sensor, the limiting groove for limiting the angle sensor is located on a bottom of the receiving groove, the angle sensor is provided with a limiting post fitting into the limiting groove.

6. The manipulator as defined in claim 5, wherein one of the lateral sides of the main body is used for gripping the target object, and the lateral side of the main body includes a mounting groove for positioning the tactile sensor.

7. The manipulator as defined in claim 6, wherein the tactile sensor includes a circuit board and a bus interface electrically connecting with the circuit board, the circuit board is facing the mounting groove, and the body portion is further provided with a receiving slot for embedding the bus interface.

8. The manipulator as defined in claim 7, wherein the main body further includes a wire trough, the wire trough is defined on a same side of the main body portion as the receiving groove is, the wire trough extends to form a port respectively in the direction of the first connecting portion and the second connecting portion, and the wire trough communicates with the receiving slot.

9. The manipulator as defined in claim 8, wherein the base module further includes a cover plate fixedly mounted on the same side of the main body as the receiving groove is, and the cover plate covers the angle sensor in the receiving groove.

10. The manipulator as defined in claim 1, further comprising a driving assembly disposed on the connecting assembly to provide a driving force for each of the finger assembly to perform gestures.

11. The manipulator as defined in claim 10, wherein the driving assembly and the connecting assembly are interconnected by a dovetail slot and a dovetail protrusion.

12. A robot, comprising:
an end effector;
a manipulator, the manipulator is installed on the end effector, the manipulator includes
a connecting assembly;
a plurality of finger assemblies, one end of each finger assembly connects to the connecting assembly, the other end is away from the connecting assembly to form a free end;
wherein each finger assembly includes a fingertip module and a plurality of knuckle components, the plurality of knuckle components are successively connected, each knuckle component includes a base module, a tactile sensor and an angle sensor, the base modules are interconnected for implementing finger configuration, the tactile sensor is installed on the base module for sensing a target object, the angle sensor is installed on the base module for acquiring information of angle changing, and the fingertip module is mounted on the free end of each finger assembly;
wherein each base module includes a main body, a first connecting portion, and a second connecting portion, the tactile sensor is installed on the main body, the first connecting portion and the second connecting portion extend from two opposites sides of the main body, the first connecting portion and the second connecting portion are defined to connect adjacent base modules, and the angle sensor is installed on the second connecting portion; and
wherein the fingertip module includes a plurality of first blocks and a first fingernail, the first blocks are spaced apart to form two first slots, the first blocks are fitted into the base module and connected with the first connecting portion, and the first fingernail is located on a side of the first block away from the base module.

13. The robot as defined in claim 12, further comprising a visual sensor assembly, wherein the visual sensor assembly is positioned between the end effector and the manipulator for acquiring the visual information of a working area of the manipulator.

* * * * *